(12) United States Patent
Kikuta et al.

(10) Patent No.: US 6,260,131 B1
(45) Date of Patent: Jul. 10, 2001

(54) METHOD AND APPARATUS FOR TLB MEMORY ORDERING

(75) Inventors: Betty Y. Kikuta; James S. Blomgren; Terence M. Potter, all of Austin, TX (US)

(73) Assignee: Intrinsity, Inc., Austin, TX (US)

( * ) Notice: Subject to any disclaimer, the term of this patent is extended or adjusted under 35 U.S.C. 154(b) by 0 days.

(21) Appl. No.: 09/195,779

(22) Filed: Nov. 18, 1998

Related U.S. Application Data

(60) Provisional application No. 60/065,650, filed on Nov. 18, 1997.

(51) Int. Cl.[7] .................................................. G06F 12/02
(52) U.S. Cl. .......................... 711/210; 711/145; 711/206
(58) Field of Search .................................... 711/145, 150, 711/151, 152, 156, 169, 173, 206, 210

(56) References Cited

U.S. PATENT DOCUMENTS

| 5,613,083 | | 3/1997 | Glew et al. . | |
|---|---|---|---|---|
| 5,644,748 | * | 7/1997 | Utsunomiya et al. | 711/207 |
| 5,680,565 | | 10/1997 | Glew et al. . | |
| 5,717,898 | * | 2/1998 | Kagan et al. | 711/145 |
| 5,819,035 | * | 10/1998 | Devaney et al. | 709/202 |
| 5,832,205 | | 11/1998 | Kelly . | |
| 5,881,264 | * | 3/1999 | Kurosawa | 712/217 |
| 5,893,165 | * | 4/1999 | Ebrahim | 711/158 |
| 5,928,334 | * | 7/1999 | Mandyam et al. | 709/248 |

\* cited by examiner

*Primary Examiner*—Hiep T. Nguyen
(74) *Attorney, Agent, or Firm*—Booth & Wright, L.L.P.; Mathew J. Booth; Karen S. Wright

(57) ABSTRACT

The present invention discloses a method and apparatus that uses extensions to the TLB entry to dynamically identify pages of memory that can be weakly ordered or must be strongly ordered and enforces the appropriate memory model on those pages of memory. Such identification and memory model enforcement allows for more efficient execution of memory instructions in a hierarchical memory design in cases where memory instructions can be executed out of order. From the page table, the memory manager constructs TLB entries that associate page frame numbers of memory operands with page-granular client usage data and a memory order tag. The memory order tag identifies the memory model that is currently being enforced for the associated page of memory. The memory manager updates the memory order tag of the TLB entry in accordance with changes in the client usage information. In the preferred embodiment, the TLB structure is a global TLB shared by all processors. In alternative embodiments, the TLB structure may comprise either multiple distributed TLBs with shared knowledge, each assigned to a different processor, or a combination of multiple local TLBs, each assigned to a different processor, that exchange information with a global TLB, which in turn provides data to the memory manager to access the hierarchical memory system.

20 Claims, 8 Drawing Sheets

METHOD AND APPARATUS FOR TLB MEMORY ORDERING

This application claims the benefits of the earlier filed U.S. Provisional Application Serial No. 60/065650, filed Nov. 18, 1997, which is incorporated by reference for all purposes into this application.

BACKGROUND OF THE INVENTION

1. Field of the Invention

The present invention relates to the field of computer systems, and more specifically, to controlling the timing and order of the execution of memory instructions in certain regions of computer memory to allow for increased processor efficiency.

2. Description of the Related Art

Current computer systems typically employ a hierarchical memory structure to facilitate the processing of memory access operations. This design practice evolved as an approach to minimize the processing delay and accompanying performance penalty that can occur while the processor is waiting for data or instructions (collectively, "memory operands") to be provided from memory, while still supplying a large physical storage space. Even in very sophisticated computers, processing can come to a complete halt (a "stall") until the memory request is serviced. Memory-related stalls may range from a few nanoseconds to several seconds, depending upon the computer's memory design, the storage location of the memory operand, and the memory access method. Designers adopted the hierarchical approach because a properly designed and managed hierarchical memory arrangement can minimize processor stalls and improve performance, without sacrificing system cost, size, or power requirements.

A commonly employed memory hierarchy is shown in FIG. 1. This design approach includes a special, high-speed memory, known as a cache, in addition to main memory and a swap space. In this hierarchical memory system, the main memory is effectively a cache for the much slower swap space storage. While the cache near the CPU is generally controlled by hardware in the CPU, the main memory is a software-controlled cache. In this discussion, unless otherwise specified, the term "cache" will always refer to the hardware-controlled cache, and the term "main memory" will always refer to the software-controlled main memory.

In a hierarchical memory design, memory operands can be dynamically shifted among swap space, main memory, and cache to ensure that the operand is provided to the processor as quickly as possible (i.e, from cache) as often as possible. This memory control function is handled by a memory management system that is commonly implemented in both hardware and software (the "memory manager"). The hardware portion of the memory manager is known as the memory management unit (MMU), and may be implemented within the processor, or it may be a separate component, either integrated on the same silicon as the processor or on an entirely different integrated circuit that interfaces with the processor and memory. FIG. 2 illustrates both the hardware and software portions of a typical memory management system. For clarity, portions of the memory management system not directly relevant to this discussion are not shown.

Referring to FIG. 2, memory management unit (MMU) 122 is shown within processor 120. MMU 122 interfaces with bus interface unit 123, which accesses main memory 131 and the system's I/O devices 132 via the system bus 133. Hardware components of the MMU 122 that are relevant to this discussion include the translation lookaside buffer (TLB) 126 and the TLB miss handler 125. Other memory management system hardware components and software functions include the load queue 127 and the store queue 128, both shown in FIG. 2 as implemented in the processor hardware, and the page miss handler (PMH) 124 and page table 129, shown in FIG. 2 in a typical software implementation.

Extending the hierarchical memory design approach resulted in the concept of "virtual memory," and the separation of a memory operand's "address" from its physical location in memory. Virtual memory is an abstraction that is used to handle three primary tasks in a computer system: (1) memory hierarchy abstraction; (2) memory protection; and (3) memory fragmentation. Virtual memory was originally conceived as a way to apply the hardware-based concept of a hierarchical memory to software; i.e., allowing software to control and use main memory as a cache for the storage space that is implemented in large, slow magnetic or optical media. Using the concept of virtual memory, an operating system (OS) can create the illusion of an accessible memory space that is much larger than the actual main memory size implemented in DRAM in the hardware. The OS maps portions of the external physical storage space (the disk drives or other storage media) into main memory, and then swaps only those blocks of the storage space currently needed into main memory (hence the term "swap space"). Swap space is also sometimes referred to as paging space, and the blocks of memory that are swapped in and out of main memory are often called pages.

Since the most recently accessed pages also contain the memory operands that are likely to be accessed soon, the OS ensures that the most recently accessed pages are available to the processor in relatively fast DRAM. Therefore, the apparent latency of the large amount of accessible memory is quite low, compared to what the latency would be if all accesses went to the hard disk or other external storage media. A programmer can write his program assuming that he has much more memory available than is implemented in DRAM on the system on which the program is running.

The amount of memory apparently available to a program is dependent upon the OS. Although the OS may create a very large amount of virtual memory, it may only allow a particular program to use a portion of the virtual memory space. If the OS supports multitasking, then it must partition and assign the virtual memory space to each of the concurrent processes. Memory protection and fragmentation are two tasks that are a necessary part of the OS's memory partitioning and assignment function. The OS protects a process's assigned memory by insuring that it cannot be corrupted by another concurrent process. Protecting memory from corruption in this manner increases system reliability.

The OS also keeps track of memory fragments actually used by a process and "stitches together" those fragments such that the process is unaware that it is actually using anything other than a contiguous block of memory. In other words, the OS does not actually assign contiguous blocks of memory to each process, because such an approach would likely result in nonuse of a large portion of assigned memory. Instead, the OS assigns available, non-contiguous fragments of virtual memory, and translates the programmer's view of his address space (sometimes called an effective address space or linear address space) to the address space represented by the assigned fragments. While the programmer's effective address space is contiguous, the virtual addresses that the OS assigns to those effective addresses may not be contiguous. This memory fragmentation function increases system efficiency by insuring that limited memory space is not wasted by being assigned and protected but unused.

To access a memory operand, the processor must take the programmer's effective address, translate it to a virtual address (the address within the large virtual memory space), and then finally, translate the virtual address into a physical address (the address within the main memory space). The physical address can then be used to access either the hardware controlled SRAM cache or the DRAM main memory.

The primary focus of this discussion is the translation from virtual to physical address. The virtual address consists of a virtual page number, plus an offset. The virtual page number identifies the relevant page of virtual memory, and the offset identifies the storage location of the operand on the page. Similarly, a physical address consists of a page frame number, plus an offset. Like the virtual page number, the page frame number identifies the appropriate block of SRAM or DRAM, and the offset identifies the actual storage location within the identified memory block.

The main structure used for the virtual address to physical address translation is the page table (129 in FIG. 2). The page table contains a virtual page number that correlates each page of memory currently in main memory to a corresponding page in the swap space. The OS is responsible for updating the page table when it swaps a new page of memory from the swap space into the main memory. To translate from a virtual to a physical address, the MMU (122 in FIG. 2) looks for the virtual page number in the page table. If the page table contains the virtual page number, then the processor knows that the page of memory containing the desired operand either is currently in the main memory.

To speed up the translation process, the most recently accessed page table entries are usually cached in the processor. This translation cache is called a translation lookaside buffer (TLB—126 in FIG. 2). The TLB is commonly controlled in hardware by the MMU 122, but it can be controlled by the OS. The virtual-to-physical address translation process is shown in the context of a memory access in the flow chart in FIG. 3.

Referring to FIG. 3, if a memory operand's virtual page number (generated from the effective address called for by the program) is not located in the TLB, then a TLB miss has occurred and the page table must be accessed to obtain the proper translation (a "page table walk.") The translation will be found in the page table only if the page has been loaded into main memory (a "page hit"). If the page miss occurs, the operand being accessed is not currently mapped into the main memory of the system, and must be retrieved from the swap space. Control passes from the MMU to the OS, which decides which page must be deleted from main memory (swapped out) to make room for the page that contains the operand the processor is trying to access. The OS swaps in the new page, and updates the page table and TLB. Finally, the original program resumes execution, and the operand called for is now located in main memory. The software that handles swapping the pages from the swap space into the main memory is called the page miss handler (PMH—124 in FIG. 2).

Along with the virtual to physical address translation, the page table generally contains additional information in order to support memory protection. For instance, a page may be marked as read-only or read-write, or a certain privilege level may be required to access data in a page. This protection and permission information is also included in the TLB entries stored in the TLB.

Since data is commonly provided to the processor from cache, rather than from the main memory, updates to memory operands must be accompanied by a corresponding update in cache, either when the update occurs, or when a miss is indicated. This dual-update requirement is referred to as data coherency.

Systems with multiple memory owning clients must generally be designed in such a manner as to maintain data coherency between all the clients, and also to track ownership of memory to prevent the clients from corrupting data written by another client. (For the purposes of this discussion, any device that can be granted temporary ownership of regions of memory is considered to be a "memory owning client." While memory owning clients will most likely be processors, they could also be intelligent peripheral controllers that can be granted temporary ownership of regions of memory.) Hardware designers utilizing multiple memory owning clients and hierarchical memory must ensure that each client receives proper data updates, that memory operands are owned (i.e., can be overwritten) by just one client at a time, and that the ownership of a memory operand is transferred from one client to another in the proper order. Data coherency and memory ownership are simple concepts, and have been addressed in the prior art by various update and ownership protocols, the most popular of which is the MESI protocol. However, the order in which ownership is transferred and access is granted is a much more complex issue that existing protocols do not address. Controlling and enforcing memory order is the subject of the present invention. (The term "memory order" is used to describe endian-ness as well as the order in which memory transactions are processed. In this discussion, memory order does NOT describe or relate to endian-ness).

Often memory accesses do not actually occur when the program thinks they occur. Due to varying latencies in the memory subsystem, memory accesses may be performed out of order, and may be perceived by the various clients as occurring at different times. For example, in a common sequence of events, an operand writing client thinks a memory operand is updated at time N, the memory system thinks it is updated at time N+M, and another client thinks it is updated at time N+M+L. If the second client reads the operand sometime between N and N+M+L, it may read a stale value. The second client's memory accesses have thus occurred out of order.

In general, as long as each client observes the same sequence of updates to a memory operand, the fact that the clients observe the operand updates occurring at different times is ordinarily not problematic. (There is an exception to the rule that each client must observe the same sequence of updates that occurs when a line owner might update a line a number of times, but only inform the memory system or other clients after the final update. However, as far as data coherency is concerned, such behavior is still considered correct). The problem occurs when multiple clients read two different memory locations and either the elapsed time between the updates of the two locations or the relative order of the updates of the two locations is important. Due to the system latencies, each client observes a different update time for each location and a different relative update time between the two location. This can result in a client observing the updates as occurring in the opposite order in which they actually do occur. In other words, if two clients, X and Y, read two lines, A and B, it may be possible for X to observe A being updated first while Y observes B being updated first. Alternatively, either client could read the wrong value for A or B if either the read or the update operation is delayed and the sequence is performed out of order.

To illustrate how this can happen, imagine client X writing line A and then line B at times N and N+1 respectively. X believes the lines are updated in the order A, B. If line A requires five units of time to appear in Y's cache, and line B requires just two units of time, then Y will observe line A being updated at time N+5 and line B being updated at time N+1+2. From Y's perspective, line B is updated first, and Y now thinks the lines were updated in the order B, A. If Y reads A and B at time N+4, Y will read the correct value for B but a stale value for A. Programs in which the order of data updates matters require a memory model called "strong," meaning that memory operations performed by multiple clients must occur in the same order in which the programs running on the clients call for the operation.

We can understand memory ordering by observing the three possible ways in which different processors may observe updates in different orders, causing a failure in a program or configuration that requires a strong memory model:

| Case 1 | | Case 2 | | Case 3 | |
| --- | --- | --- | --- | --- | --- |
| Processor1 | Processor2 | Processor1 | Processor2 | Processor1 | Processor2 |
| Write_A | B_new | Write_A | Write_B | B_new | A_new |
| Write_B | A_old | B_old | A_old | Write_A | Write_B |

In this table, Write_A indicates that a processor updates line A and thinks line A contains the updated value. Likewise, Write_B indicates that a processor updates line B and thinks line B contains the updated value. B_new indicates that a processor reads line B and finds it to contain the updated value. Similarly, A_old indicates that a processor reads line A before it knows that line A has been updated, and thus reads a stale value.

Consider a program that includes an operation on A and B, executes that operation using both Processor1 and Processor2, and requires both Processor1 and Processor2 to execute the operation using the updated values. The program requires a strong memory model to function properly. Case 1 shows the most simple failure sequence where Processor1 performs the write operations in the order A, B, and therefore thinks that A and B have been updated in the order A, B. However, Processor2 observes the lines being updated in the wrong order and reads both lines before it sees a new value for A. Under this scenario, Processor2 will improperly execute its part of the program operation using a stale value for A.

Case 2 shows a sequence where Processor1 writes a new value for A and Processor2 writes a new value for B. However, Processor1 then reads B before it knows that B has been updated, and Processor2 reads A before it knows that A has been updated. Processor1 will perform its part of the program operation using an updated value for A but a stale value for B, while Processor2 will perform its part of the program operation using an updated value for B and a stale value for A.

Case 3 illustrates a slightly different failure mechanism. In Case 3, both processors are running a program in which they are to read one value, and then update the other. Processor1 reads B and then updates A. Processor2 reads A and then updates B. In the failure illustrated in Case 3, the read operation in both processors experiences a queue delay, but the writes proceed. By the time the reads are actually performed, the values have been updated and the "old" value—the correct value for the read operation—has been overwritten. Had the Case 3 memory operations been strongly ordered, the updates would not have occurred until the reads had been completed.

Not every computer program or operation requires a strong memory model to function correctly, and thus other memory models exist. The "weak" memory model places very few requirements on the order of operand updates. Typically, a weak memory model requires the sequence of physical updates to any individual memory location to occur in the same order in which the program on the processor calls for updates, but places no requirements on the inter-relationship of order between different memory locations. There are a host of intermediate models too numerous to discuss here.

The stronger the memory model, the poorer the system performance. Strong memory models allow much less freedom in the way in which memory accesses are performed. For example, DRAM components have columns and banks, and when one of these is "open," further accesses to it can occur at a much greater rate. An optimized memory configuration will attempt to perform transactions to DRAM in an order which corresponds to the addresses most quickly accessed, not in the order in which requests are made. A weak memory model allows great freedom in reordering requests. A strong memory model allows little if any freedom in reordering requests.

Most software running today was written long before either multiprocessor configurations or out-of-order execution of memory accesses became popular, and therefore without regard to any specific memory model. As a result, it is difficult to determine if a program, or even if an operating system, will operate in a multiclient system with a weak memory ordering model. The practical result is that in a multiclient system, the strong memory model is generally required as the default memory model, with the option to "weaken" it for newer applications. Practical implementations must support either a variety of memory models, or forfeit performance and operate only in the most restrictive model. Therefore, it would be desirable to employ a memory management approach that dynamically determines when the memory model can be relaxed, and enforces a strong memory model only at those times and for those regions of memory in which a strong memory model is required to avoid program failures.

For example, if a memory region is known to be read-only memory, then there is no need to enforce strong memory ordering because no client can write updates to that region of memory, and data in read-only memory is never stale. Similarly, if a region of memory is known to be accessible by just one CPU, then that region of memory can be treated as weakly ordered because no other client will ever see out-of-order updates. Even if a memory region is shared by multiple clients, that region can be weakly ordered if no line in the region is ever shared by multiple clients. If a region contains lines that are shared by multiple clients, but no line is immediately loadable into more than one client's cache, then that region can be weakly ordered. Finally, if it is known that a program is not sensitive to memory ordering, then data at memory locations accessed by that program can be handled in accordance with a weakly ordered memory model. There are other instances, not described here, where relaxed memory ordering is possible.

On the other hand, if a system includes multiple processors that share data under conditions such that one of the ordering failures discussed above could occur, that data must be handled according to a strong memory model. Likewise, in systems with one or more processors capable of performing out-of-order or speculative instructions, reordered or speculative loads will be sent to memory by such processors in unusual orders. Therefore, these loads cannot be sent to regions of memory in which a strong memory model is being enforced.

The present invention discloses a method and apparatus that identifies regions of memory that can be weakly ordered or must be strongly ordered and enforces the appropriate memory model in those regions of memory. Using extensions to the TLB entry, the present invention dynamically associates one of two different memory ordering models for executing memory operations with specific pages of memory. Such identification and memory model enforcement allows for more efficient execution of memory instructions in cases where memory instructions can be executed out of order. An initial memory model is associated with each page of memory in the page table utilized in a system with a hierarchical memory design. The memory manager enforces and updates the memory model by constructing a TLB entry and loading the TLB with the memory model appropriate for each page during TLB updates. In the preferred embodiment, the TLB is a global TLB. Alternatively, the TLB may comprise either multiple distributed TLBs with shared knowledge, each assigned to a different processor, or a combination of multiple local TLBs, each assigned to a different processor, that exchange information with a global TLB.

SUMMARY OF THE INVENTION

The present invention discloses a method and apparatus that identifies regions of memory that can be weakly ordered or must be strongly ordered and enforces the appropriate memory model in those regions of memory. Using extensions to the TLB entry, the present invention dynamically associates one of two different memory models for executing memory operations with specific pages of memory. Such identification and memory model enforcement allows for more efficient execution of memory instructions in cases where memory instructions can be executed out of order.

For example, if a memory region is known to be read-only memory, then there is no need to enforce strong memory ordering because no client can write updates to that region of memory, and data in read-only memory is never stale. Similarly, if a region of memory is known to be accessible by just one CPU, then that region of memory can be treated as weakly ordered because no other client will ever see out-of-order updates. Even if a memory region is shared by multiple clients, that region can be weakly ordered if no line in the region is ever shared by multiple clients. If a region contains lines that are shared by multiple clients, but no line is immediately loadable into more than one client's cache, then that region can be weakly ordered. Finally, if it is known that a program is not sensitive to memory ordering, then data at memory locations accessed by that program can be handled in accordance with a weakly ordered memory model.

On the other hand, if a system includes multiple processors that share data under conditions such that one of the ordering failures discussed above could occur, that data must be handled according to a strong memory model. Likewise, in systems with one or more processors capable of performing out-of-order or speculative instructions, reordered or speculative loads will be sent to memory by such processors in unusual orders. Therefore, these loads cannot be sent to regions of memory in which a strong memory model is being enforced.

The present invention dynamically enforces different memory models for different regions of memory by exploiting extensions to the TLB entry. Information is included in an extension to the TLB entry that tags data on specific pages of memory as being located in a memory region that either must be strongly ordered, or can be weakly ordered.

In the preferred embodiment, a memory manager controls the memory model in a hierarchical memory system by constructing and updating a TLB entry that includes a memory order field from information within the page table. The memory manager then provides the TLB entry to a global TLB. Alternatively, the TLB may comprise either multiple distributed TLBs with shared knowledge, each assigned to a different processor, or a combination of multiple local TLBs, each assigned to a different processor, that exchange information with a global TLB.

BRIEF DESCRIPTION OF THE DRAWINGS

To further aid in understanding the invention, the attached drawings help illustrate specific features of the invention and the following is a brief description of the attached drawings.

DETAILED DESCRIPTION OF THE INVENTION

The present invention discloses a method and apparatus that dynamically enforces different memory models for different regions of memory by exploiting extensions to the TLB entry. Information is included in an extension to the TLB entry that tags pages of memory as being located in a memory region that either must be strongly ordered, or can be weakly ordered. This disclosure describes numerous specific details and embodiments in order to provide a thorough understanding of the present invention. One skilled in the art will appreciate that one may practice the present invention without these specific details.

Figure 4:
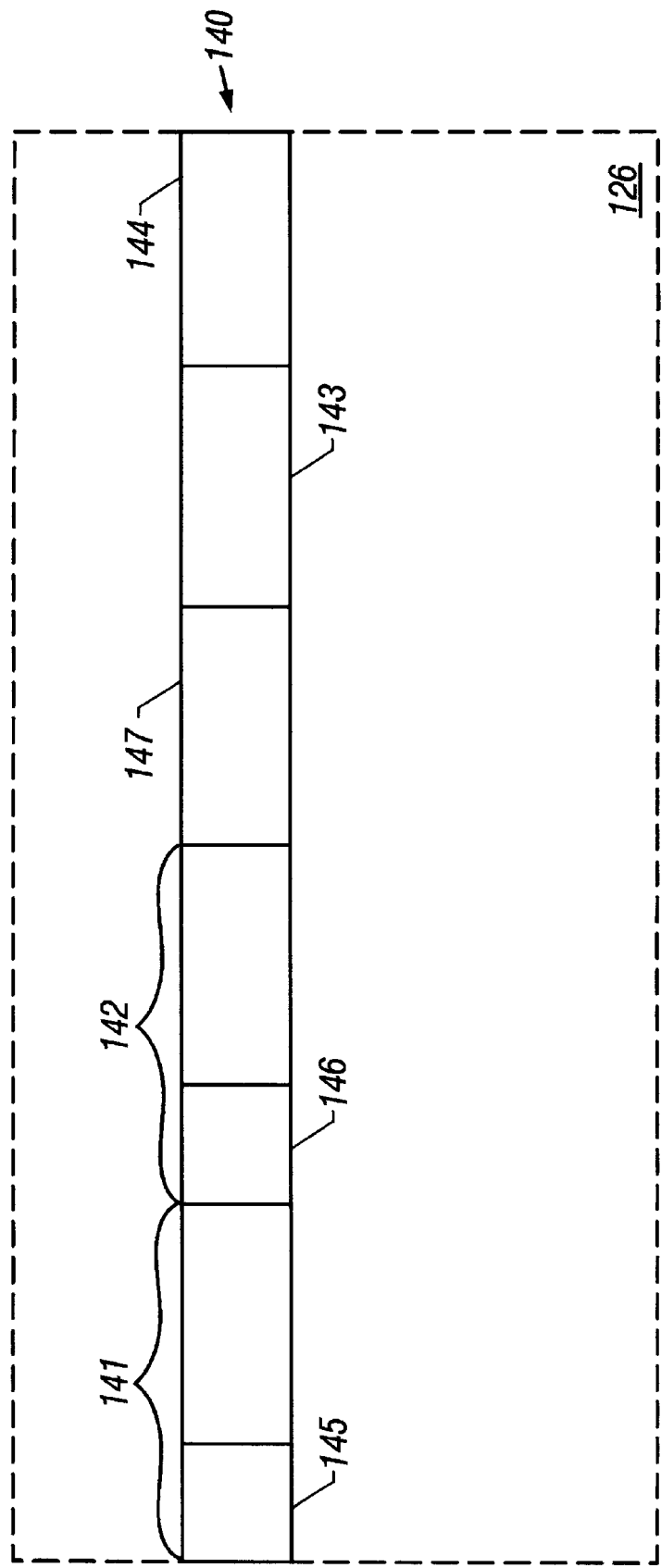
FIG. 4 is an exemplary TLB entry utilizing the present invention.

FIG. 4 illustrates an exemplary TLB entry 140 that utilizes the memory order extension and client usage extensions of the present invention. TLB entry 140 includes a physical address field 141, a virtual address field 142, a protection field 147, a client usage field 143, and a memory order field 144. Physical address field 141 further includes page frame number 145. Virtual address field 142 further includes virtual page number 146.

Figure 1:
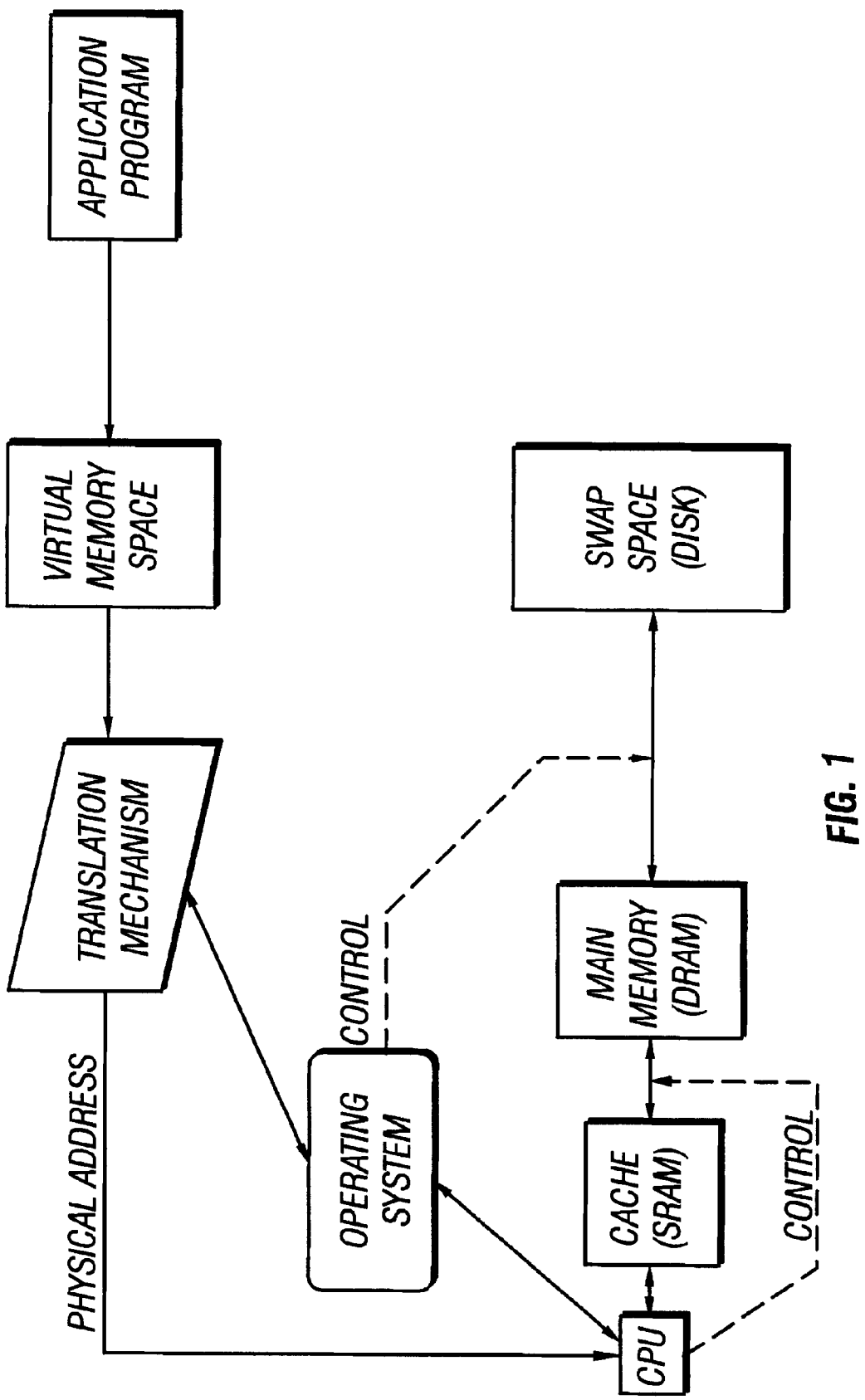
FIG. 1 illustrates a typical hierarchical memory architecture.
Figure 2:
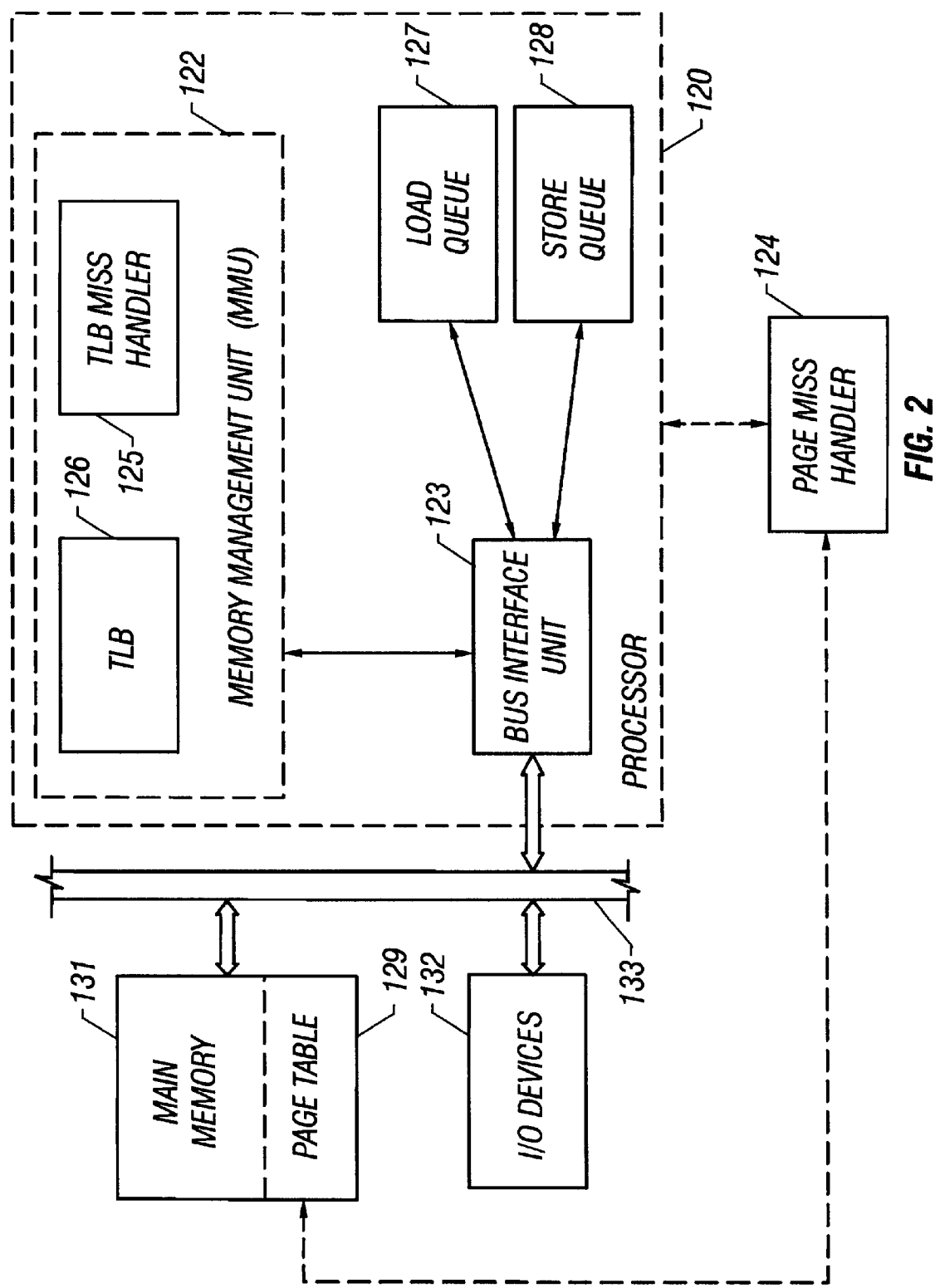
FIG. 2 is a functional block diagram showing the various hardware and software components of a memory management system.
Figure 3:
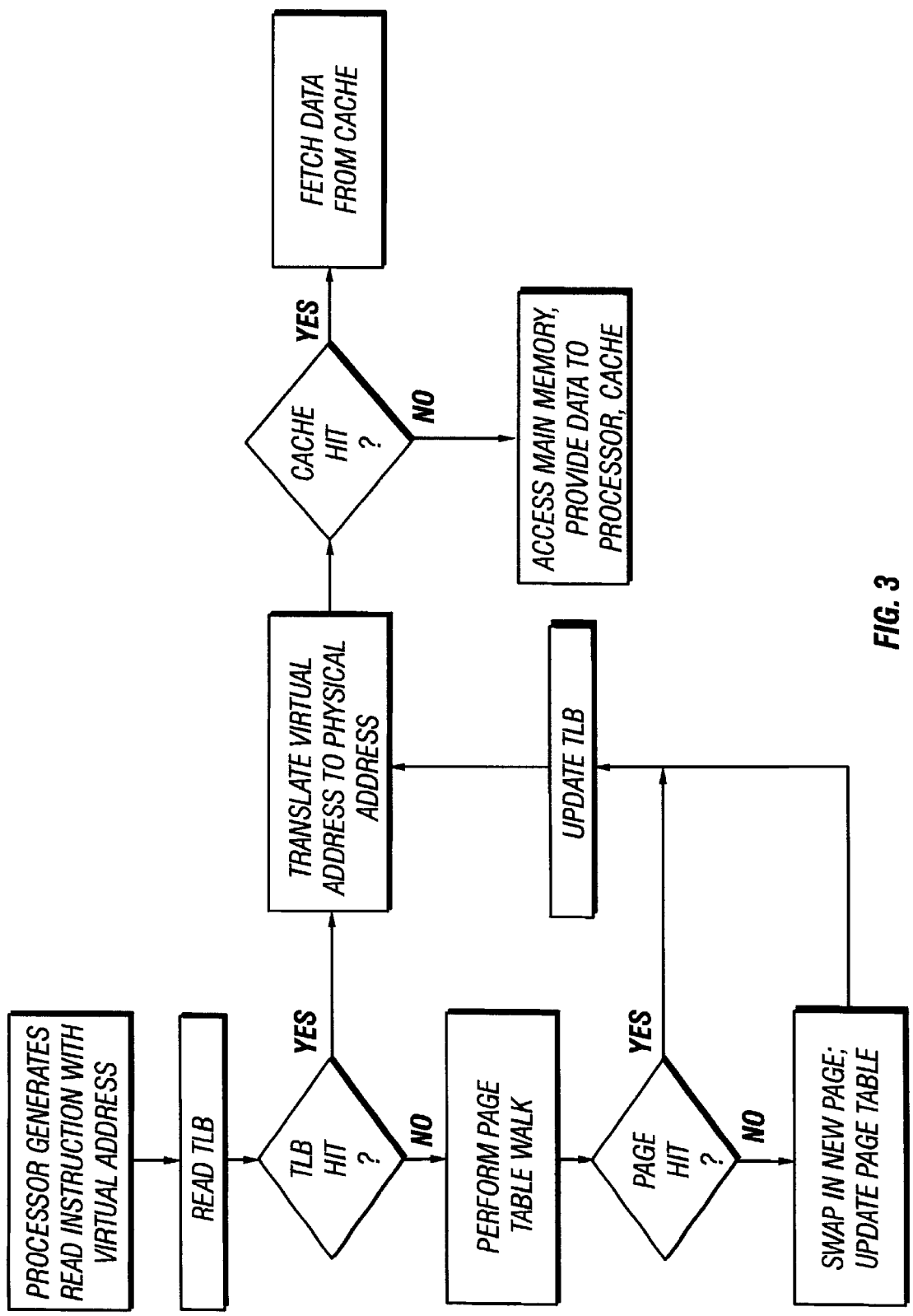
FIG. 3 is a functional block diagram showing a typical memory access sequence.
Figure 5:
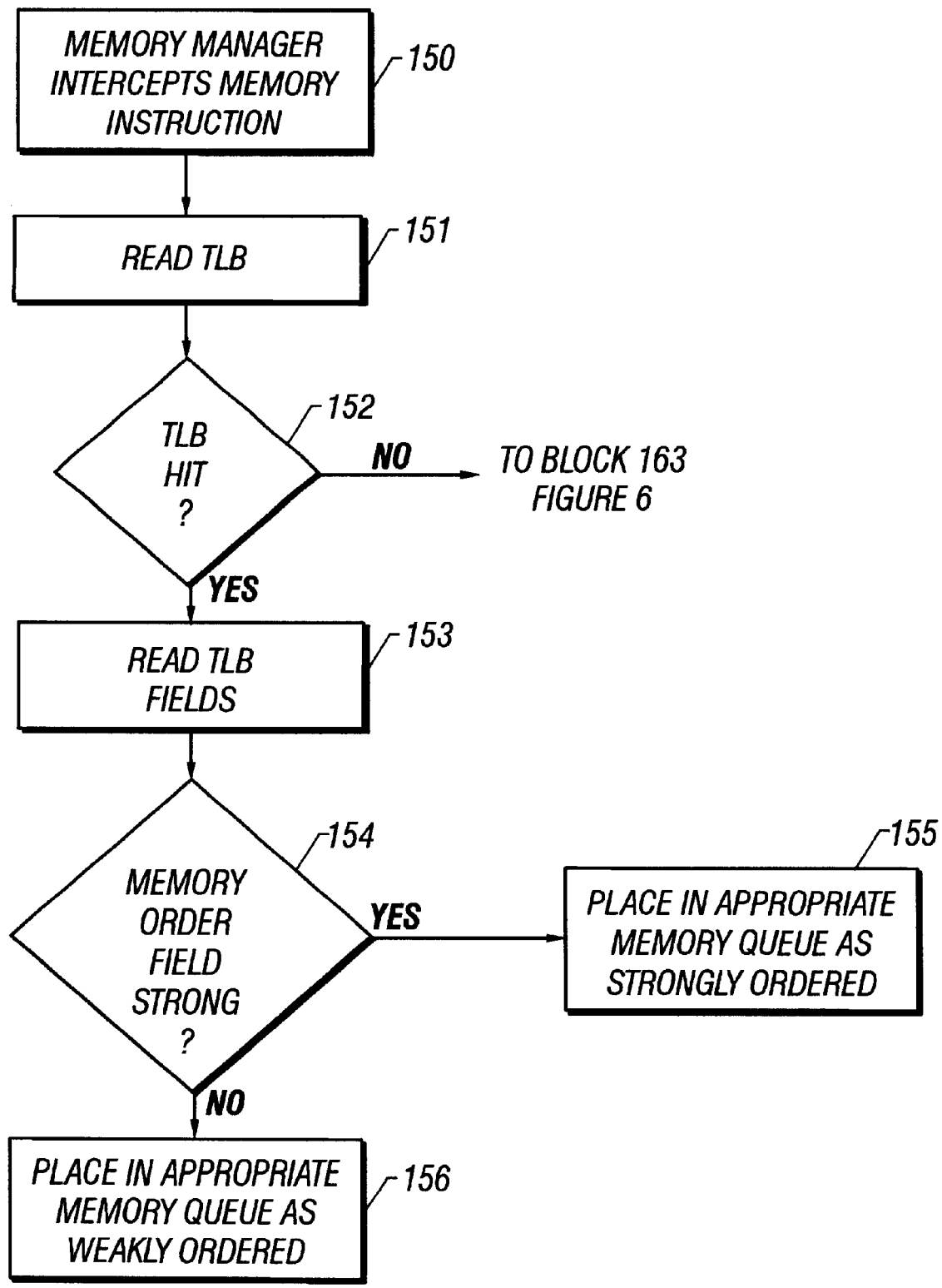
FIG. 5 is a functional block diagram showing a memory access operation utilizing the present invention.
Figure 6:
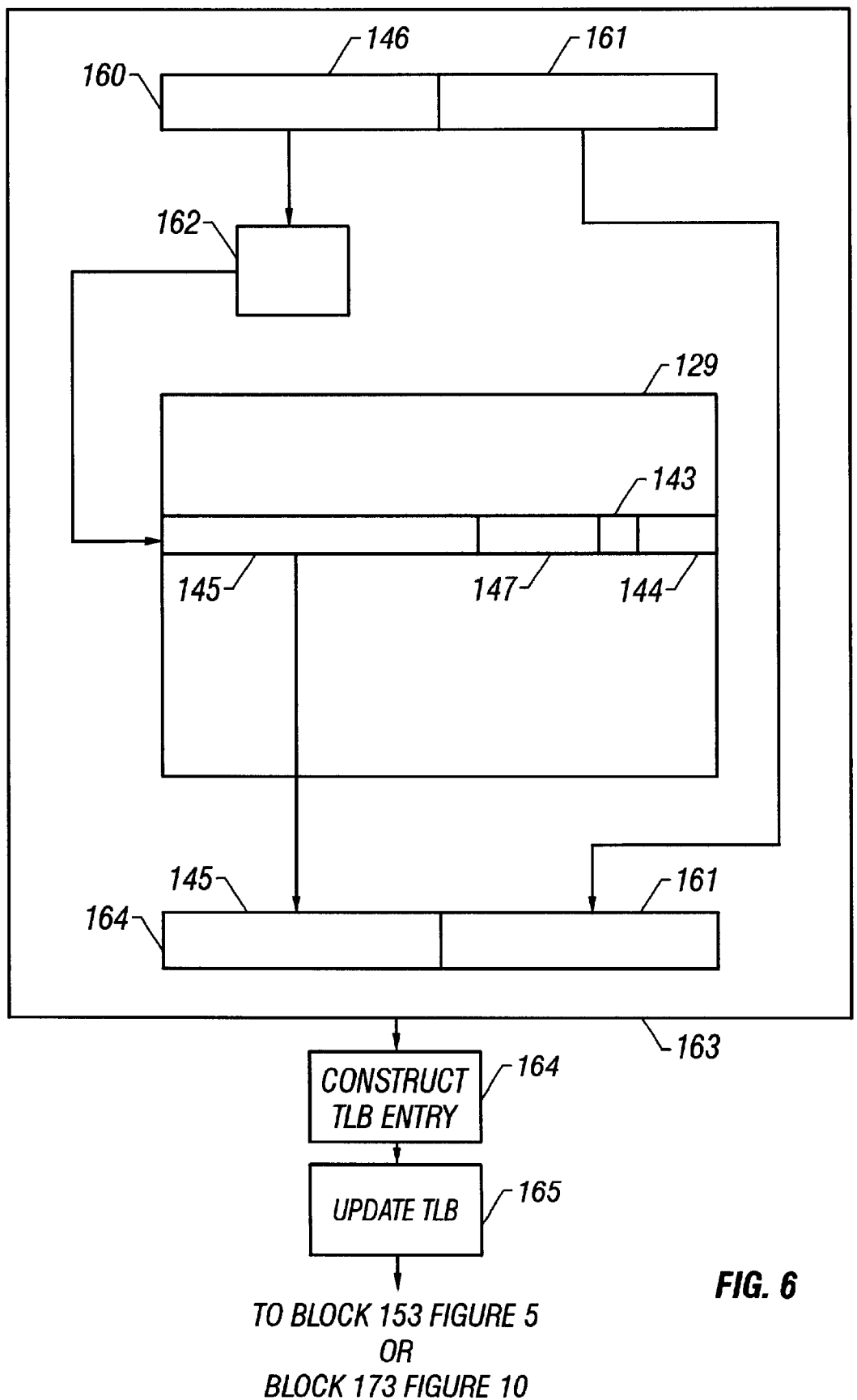
FIG. 6 is a functional block diagram showing a typical page table walk and TLB update utilizing the present invention.

FIGS. 5 and 6 depict the method, in flow chart form, that a memory management system 121 utilizing the present invention performs a memory access operation. Although FIGS. 5 and 6 illustrate the method steps in flow chart form, those skilled in the art will appreciate that each block of the flow charts also represent a function, device, or circuit within a computer system for performing the described action. In some cases, the action will be performed by dedicated hardware. In other cases, the action may be performed by micro-code or other software, or a combination of hardware and software. Unless otherwise noted, the actual hardware and/or software implementation of the steps in FIGS. 5 and 6 is not necessarily pertinent to the invention and will therefore not be described in detail. Also, the method by which the memory management system performs the memory operation utilizing the TLB extension, and updates the TLB will be described by referring primarily to FIGS. 5 and 6. However, for clarity, the description includes occasional reference to the memory management system block diagram illustrated in FIG. 2 and the exemplary TLB entry shown in FIG. 4.

Referring to FIG. 5, initially, a memory-owning client has generated and dispatched a memory instruction that includes a memory access code (store or load) and a linear address that has been translated into a virtual address. The MMU 122 (of FIG. 2) intercepts 150 the memory instruction and accesses 151 the TLB 126. If a TLB hit is detected at 152, the MMU 122 translates the virtual address into the physical address at which the memory operation is to occur. At 153, the MMU 122 reads the page frame number 145 (of FIG. 4), the client usage field 143 for that page, and the memory order field 144 appropriate for that page of memory. The MMU 122 identifies, at 154, the memory model being enforced for that page of memory. Depending upon the memory model identified by the memory order field 144, the memory manager places the instruction into the appropriate queue (either the store queue 128 or the load queue 127) tagged to perform the memory access in accordance with either a strong memory order 155 or a weak memory order 156.

In the case where the virtual page number of the operand to be accessed is not currently present in the TLB (a "TLB miss"), the MMU 122 accesses the PMH 124, which performs a page table walk and updates the TLB. The page table walk and TLB update sequence is shown in FIG. 6. To perform the page table walk 163, the PMH 124 reads the virtual address 160 of the memory operand to be accessed. The virtual address 160 is comprised of the virtual page number 146 and the page offset 161. The PMH 124 generates from the virtual address 160 a page directory entry 162 and a page frame number 145. The PMH 124 then accesses the page table 129, looks up the entry identified by the page directory entry 162 and the page frame number 145, reads the protection and other address-related information in the protection field 147, reads the client usage field 143 initially associated with that page of memory, reads the memory order model to be initially enforced for that page of memory from the memory order field 144, and constructs the real address 164 using the page frame number 145 and the page offset 161. The PMH 124 also constructs 164 a new TLB entry 140 that contains the virtual page number 146, the page frame number 145, protection information 147, client usage data 143, and memory order field 144 that identifies the memory ordering model to be initially enforced on page frame number 145. The MMU 122 updates 165 the TLB 126 with the new TLB entry 140. Returning to FIG. 5, then, depending upon the memory model identified in the memory order field 144, the memory manager 122 places the operand into the appropriate memory queue (either the store queue 128 or the load queue 127) to be stored or loaded in accordance with either a strong memory order model 155 or a weak memory order model 156.

The memory order field for each page of memory within the page table can be initially set depending upon the system design and the applications running on the system. For maximum processing efficiency, designers should initially associate a weak memory ordering model with most pages of memory, but allocate certain pages of memory to strong memory ordering.

The following discussion describes several embodiments of the present invention in which the system design would allow a weak memory ordering model to be enforced initially, with the option to dynamically strengthen the model as required.

Figure 7:
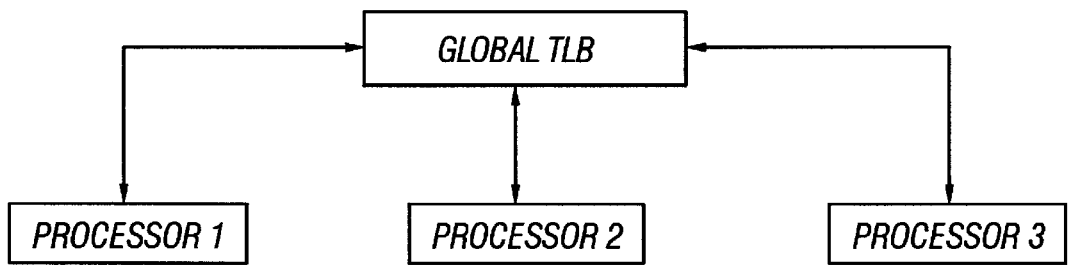
FIG. 7 shows a global TLB architecture.
Figure 8:
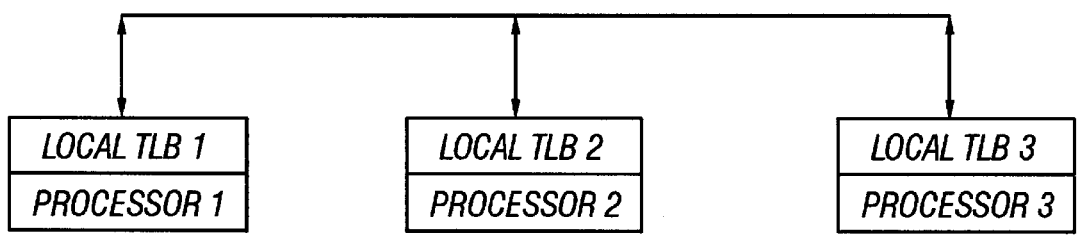
FIG. 8 shows a distributed TLB architecture.
Figure 9:
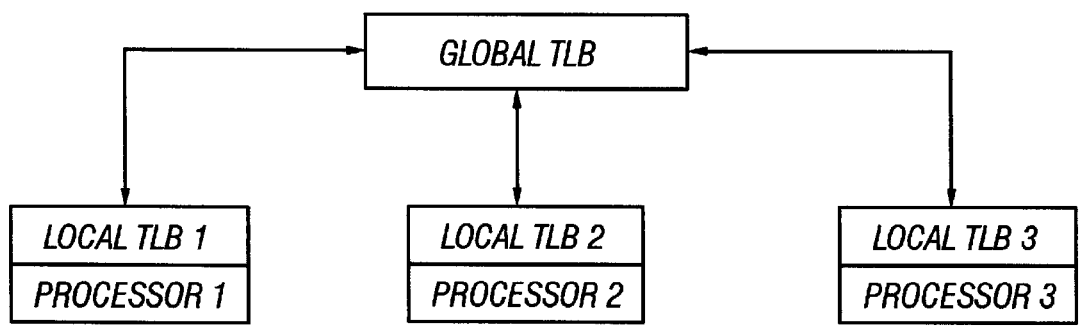
FIG. 9 shows a distributed TLB architecture controlled by a global TLB.

A multiprocessor configuration typically contains one TLB and onboard memory management system per processor. The PMH within each memory management system accesses a global page table. With decreasing lithography it is becoming possible to integrate multiple clients on a single piece of silicon. This level of integration allows for thousands of connections between such clients at virtually no cost, and makes practical a single, shared TLB (a "global TLB"). This system architecture is shown in FIG. 7 Alternatively, as shown in FIG. 8, each processor on a single piece of silicon could be assigned a local TLB and a communication path between the local TLBs could be provided. Finally, as shown in FIG. 9, the TLB design could be a combination of the two approaches, with local TLBs controlled by a global TLB. The TLB design affects the way updates to the TLB entry are handled. More particularly, the TLB design affects the way the memory model is dynamically updated.

In the global TLB implementation shown in FIG. 7, to ensure that memory operand processing is as efficient as possible, when an entry is placed into the global TLB from the page table it should be marked as weakly ordered in the memory order field 144 and usable only by the client that requests it in the client usage field 143. If another client requests the same page, the existing global TLB entry's client usage field 143 is updated to indicate that the additional client has usage rights as well, and the existing global TLB entry's memory order field 144 is updated to indicate that memory operations must now be strongly ordered instead of weakly ordered.

Figure 10A:
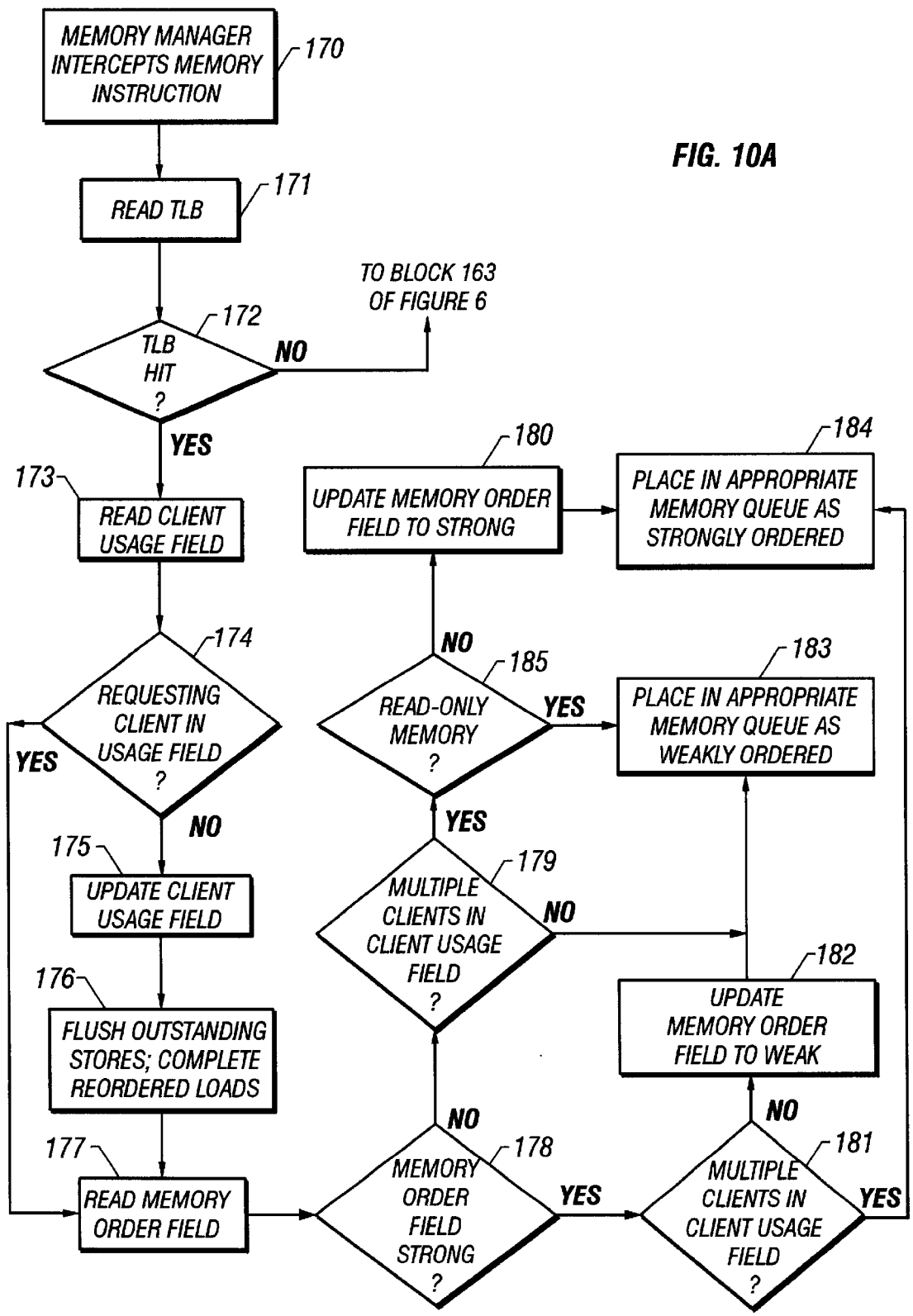
FIG. 10 is a functional block diagram showing a memory access operation utilizing the present invention in a global TLB structure, and allowing for dynamic memory order updates.

FIG. 10 shows the basic memory access process depicted in FIG. 5, modified as required to support dynamic updates to the memory model, when the present invention is practiced in the system configuration shown in FIG. 7. Blocks 170, 171, and 172 of FIG. 10 are identical to blocks 150, 151, and 152, respectively, of FIG. 5, and the description of the functions of those blocks will not be repeated. Also, the page table walk and TLB update sequence shown in FIG. 6 does not change in the multiprocessor/global TLB implementation of FIG. 7.

At block 173, however, additional steps not shown in the FIG. 5 access sequence must be performed. The MMU 122 reads the TLB entry client usage field 143 to determine whether the client requesting the memory operation has accessed that page of memory before. If, at 174, the client has already accessed the page, the memory manager 122 skips blocks 175 and 176, and reads the memory order field 144 at block 177.

On the other hand, at block 174, if the client usage field 143 shows that the client requesting the access has not accessed that page, the MMU 122 updates 175 the client usage field 143 in the TLB entry 140 to add the requesting client to the client usage information, and flushes any outstanding stores and completes reordered loads for the page requested at block 176. This step is necessary to eliminate the possibility of outstanding stores and loads occurring in the wrong memory model. As discussed below, with one exception, when a client is added to the client usage field and after the addition, the client usage field indicates that multiple clients have access rights, the memory model identified for the page is always updated to strong if it was originally weak. Outstanding loads and stores to that page will likely be weakly ordered if only one client originally had accessed the page, and an ordering failure might occur if prior loads and stores are not flushed before subsequent strongly ordered loads and stores are queued.

At block 177, the MMU 122 reads the TLB entry memory order field 144. If the memory order field 144 identifies a strong memory order for the page of memory, the memory manager 122 proceeds to block 181. If there are multiple clients identified in the TLB entry client usage field 143, at block 184 the MMU 122 places the operand in the appropriate memory queue tagged as strongly ordered. However, if only one client is identified in the client usage field 143, the memory order field 144 can be changed from strong to weak at block 182, and the operand can be placed in the appropriate queue tagged as weakly ordered at block 183.

Blocks 181 and 182 are provided to allow for weakening a strong memory model for certain pages of memory. This is desirable when, for example, a client ceases to use a page. Existing implementations provide for TLB invalidate instructions that clear TLB entries in certain circumstances. In a multiple processor configuration with a global TLB, a TLB invalidate instruction issued because a client no longer needs a page would simply clear the appropriate client from the client usage field 143 for that page. If this occurred, leaving only one client identified in the client usage field 143, the memory model for that page can generally be weakened, until another client is added to the client usage field 143 in the TLB entry. If the client that ceased using the page is the only client identified in the client usage field 143 for the page, the TLB entry is removed from the global TLB.

Of course, designers have the option to eliminate blocks 181 and 182 if the designer decides not to allow dynamic weakening of the memory model when clients stop using a page. This would be an appropriate choice if, for example, the designer decided to allocate certain pages of memory to strong ordering in the page table, even if only one processor could use that page.

Returning to FIG. 10, at block 178, if the MMU 122 determines that the memory order identified for the page is weak, the MMU 122 proceeds to block 183 and places the operand in the appropriate memory queue tagged as weakly ordered if, at block 179, there are not multiple clients that can use the page, as identified by the client usage field 143. If there are multiple clients that can use the page under consideration, at 185, the MMU 122 checks the protection field 147 of the TLB entry 140 to determine whether the page under consideration is read-only memory. If the page is read-only memory, the MMU 122 proceeds to block 183 and places the operand into the appropriate memory queue tagged as weakly ordered. If the page is not read-only memory, the MMU proceeds to block 180 and updates the memory order field 144 to enforce a strong memory order during the time the TLB entry 140 remains in the global TLB. As processing continues, the updated TLB entry 140 may be flushed from the TLB because memory operations are occurring at other pages of memory, or because the TLB entry is invalidated because the page is swapped out of main memory. If the page is re-loaded into the TLB because subsequent processing returns to that page, the page is reloaded with the initial memory order originally identified in the page table 129. The memory order for that page can once again be strengthened if required due to access by multiple clients.

In the distributed TLB configuration shown in FIG. 8, the basic memory access process and the ability to dynamically update the memory model being enforced for certain pages of memory described in FIG. 10 is followed, but the TLB update sequence shown in FIG. 6 includes extra steps to accommodate the multiple TLBs. The actual steps of the page table walk 163 do not change in a distributed TLB configuration, however, the TLB update process does change, as described below.

In a distributed TLB configuration, when an entry is initially provided to an individual TLB from the page table 129 it should be marked as weakly ordered and usable only by the client that requests it. Additionally, the other TLBs must be queried to determine whether they also contain the translation. If the translation is present in other TLBs, then every TLB entry 140 containing that translation is updated to indicate that the appropriate clients have access as well, and that memory operations must now be strongly ordered instead of weakly ordered. This query-and-update sequence must be followed in every instance in FIG. 6 and FIG. 10 where a TLB entry is updated, e.g., block 165 of FIG. 6, and blocks 175, 180, and 182 of FIG. 10.

Finally, in the two-level TLB structure shown in FIG. 9, each processor has a local TLB that reads entries from a global TLB. The access process and memory model enforcement and updating would occur at the global TLB level in accordance with FIG. 10. However, any TLB updates to the global TLB entry would also be accompanied by updates to the individual TLBs whose processors are identified as having access to the page being updated.

The present invention discloses a method and apparatus that identifies regions of memory that can be weakly ordered or must be strongly ordered and enforces the appropriate memory model on those regions of memory. Using extensions to the TLB entry, the present invention dynamically associates one of two different memory models for executing memory operations with specific pages of memory. Such identification and memory model enforcement allows for more efficient execution of memory instructions in cases where memory instructions can be executed out of order. An initial memory model is associated with each page of memory in a page table utilized in a system with a hierarchical memory design. The memory manager enforces the memory model by loading and updating the TLB entry with the memory model appropriate for each page during TLB updates. The memory manager constructs TLB entries that include the page frame number of the address of the memory operand that is the subject of the memory instruction, along with permission information and a tag identifying the page as a region of memory that either can be weakly ordered, or must be strongly ordered. The memory manager updates the memory ordering tag in accordance with changes in the client usage information. In the preferred embodiment, the TLB structure is a global TLB shared by all processors. In alternative embodiments, the TLB structure may comprise either multiple distributed TLBs with shared knowledge, each assigned to a different processor, or a combination of multiple local TLBs, each assigned to a different processor, that exchange information with a global TLB, which in turn provides data to the memory manager to access the hierarchical memory system.

Other embodiments of the invention will be apparent to those skilled in the art after considering this specification or practicing the disclosed invention. The specification and examples above are exemplary only, with the true scope of the invention being indicated by the following claims.

We claim the following invention:

1. A method that provides a memory ordering protocol for specific pages of memory, comprising:

providing a translation lookaside buffer (TLB) entry, said TLB entry comprises data address information and a memory ordering tag, said data address information further comprising a page frame number, said memory ordering tag further comprising information that identifies the page frame number as a region of memory in which memory instructions either can be weakly ordered or must be strongly ordered; and coupling said TLB entry with either a first or a second memory model, said first memory model further comprising logic to process all memory addresses located on said page frame number in accordance with a strong memory model, said second memory model further comprising logic to process all memory addresses located on said page frame number in accordance with a weak memory model.

2. The method of claim 1 wherein said memory ordering tag further comprises information identifying the address of the data to be accessed as located in a region of memory that contains data that is accessible by more than one processor and must be strongly ordered.

3. The method of claim 1 wherein said memory ordering tag further comprises information identifying the address of the data to be accessed as located in a region of memory that is read-only memory and can be weakly ordered.

4. The method of claim 1 wherein said memory ordering tag further comprises information identifying the address of the data to be accessed as located in a region of memory that contains data that may be accessed by only one processor and can be weakly ordered.

5. The method of claim 1 wherein said memory ordering tag further comprises information identifying the address of the data to be accessed as located in a region of memory that contains data that may be accessed by more than one processor, but access is sufficiently temporally separate that memory instructions to said region of memory can be weakly ordered.

6. A method that uses a memory ordering protocol for specific pages of memory, comprising:

generating a translation lookaside buffer (TLB) entry, said TLB entry comprises data address information and a memory ordering tag, said data address information further comprises a page frame number, said memory ordering tag further comprising information that identifies the address of the data to be accessed as located in a region of memory in which memory instructions either can be weakly ordered or must be strongly ordered; and interpreting said memory ordering tag of said TLB entry to associate said memory addresses on said page frame number with either a first or a second memory model, said first memory model further comprising logic to process all memory accesses to addresses located on said page frame number in accordance with a strong memory model, said second memory model further comprising logic to process all memory accesses to addresses located on said page frame number in accordance with a weak memory model.

7. The method of claim 6 wherein said memory ordering tag further comprises information identifying the address of the data to be accessed as located in a region of memory that contains data that is accessible by more than one processor and must be strongly ordered.

8. The method of claim 6 wherein said memory ordering tag further comprises information identifying the address of the data to be accessed as located in a region of memory that is read-only memory and can be weakly ordered.

9. The method of claim 6 wherein said memory ordering tag further comprises information identifying the address of the data to be accessed as located in a region of memory that contains data that may be accessed by only one processor and can be weakly ordered.

10. The method of claim 6 wherein said memory ordering tag further comprises information identifying the address of the data to be accessed as located in a region of memory that contains data that may be accessed by more than one processor, but access is sufficiently temporally separate that memory instructions to said region of memory can be weakly ordered.

11. A system that defines a memory ordering protocol for specific pages of memory, comprising:

a translation lookaside buffer (TLB) entry, said TLB entry comprises data address information and a memory ordering tag, said data address information further comprising a page frame number, said memory ordering tag further comprising information that identifies the address of the data to be accessed as located in a region of memory in which memory instructions either can be weakly ordered or must be strongly ordered; and first and second memory models associated with said memory ordering tag, said first memory model further comprising logic to associate and process all memory addresses located on said page frame number in accordance with a strong memory model, said second memory model further comprising logic to associate and process all memory addresses located on said page frame number in accordance with a weak memory model.

12. The system of claim 11 wherein said memory ordering tag further comprises information identifying the address of the data to be accessed as located in a region of memory that contains data that is accessible by more than one processor and must be strongly ordered.

13. The system of claim 11 wherein said memory ordering tag further comprises information identifying the address of the to be accessed as located in a region of memory that is read-only memory and can be weakly ordered.

14. The system of claim 11 wherein said memory ordering tag further comprises information identifying the address of the data to be accessed as located in a region of memory that contains data that may be accessed by only one processor and can be weakly ordered.

15. The system of claim 11 wherein said memory ordering tag further comprises information identifying the address of the data to be accessed as located in a region of memory that contains data that may be accessed by more than one processor, but access is sufficiently temporally separate that memory instructions to said region of memory can be weakly ordered.

16. A memory page tagging apparatus that invokes either a strong memory ordering protocol or a weak memory ordering protocol that processes memory instructions on specified pages of memory, comprising:

a translation lookaside buffer (TLB) entry, said TLB entry comprises data address information and a memory ordering tag, said data address information further comprising a page frame number, said memory ordering tag further comprising information that identifies the address of the data to be accessed as located in a region of memory in which memory instructions either can be weakly ordered or must be strongly ordered; and first and second memory models associated with said memory ordering tag, said first memory model further comprising logic to associate and process all memory addresses located on said page frame number in accordance with a strong memory model, said second memory model further comprising logic to associate and process all memory addresses located on said page frame number in accordance with a weak memory model.

17. The apparatus of claim 16 wherein said memory ordering tag further comprises information identifying the address of the data to be accessed as located in a region of memory that contains data that is accessible by more than one processor and must be strongly ordered.

18. The apparatus of claim 16 wherein said memory ordering tag further comprises information identifying the address of the data to be accessed as located in a region of memory that is read-only memory and can be weakly ordered.

19. The apparatus of claim 16 wherein said memory ordering tag further comprises information identifying the address of the data to be accessed as located in a region of memory that contains data that may be accessed by only one processor and can be weakly ordered.

20. The apparatus of claim 16 wherein said memory ordering tag further comprises information identifying the address of the data to be accessed as located in a region of memory that contains data that may be accessed by more than one processor, but access is sufficiently temporally separate that memory instructions to said region of memory can be weakly ordered.

* * * * *